May 27, 1930.  A. L. BUCK  1,760,342
WEIGHING SCALE
Filed Sept. 26, 1928
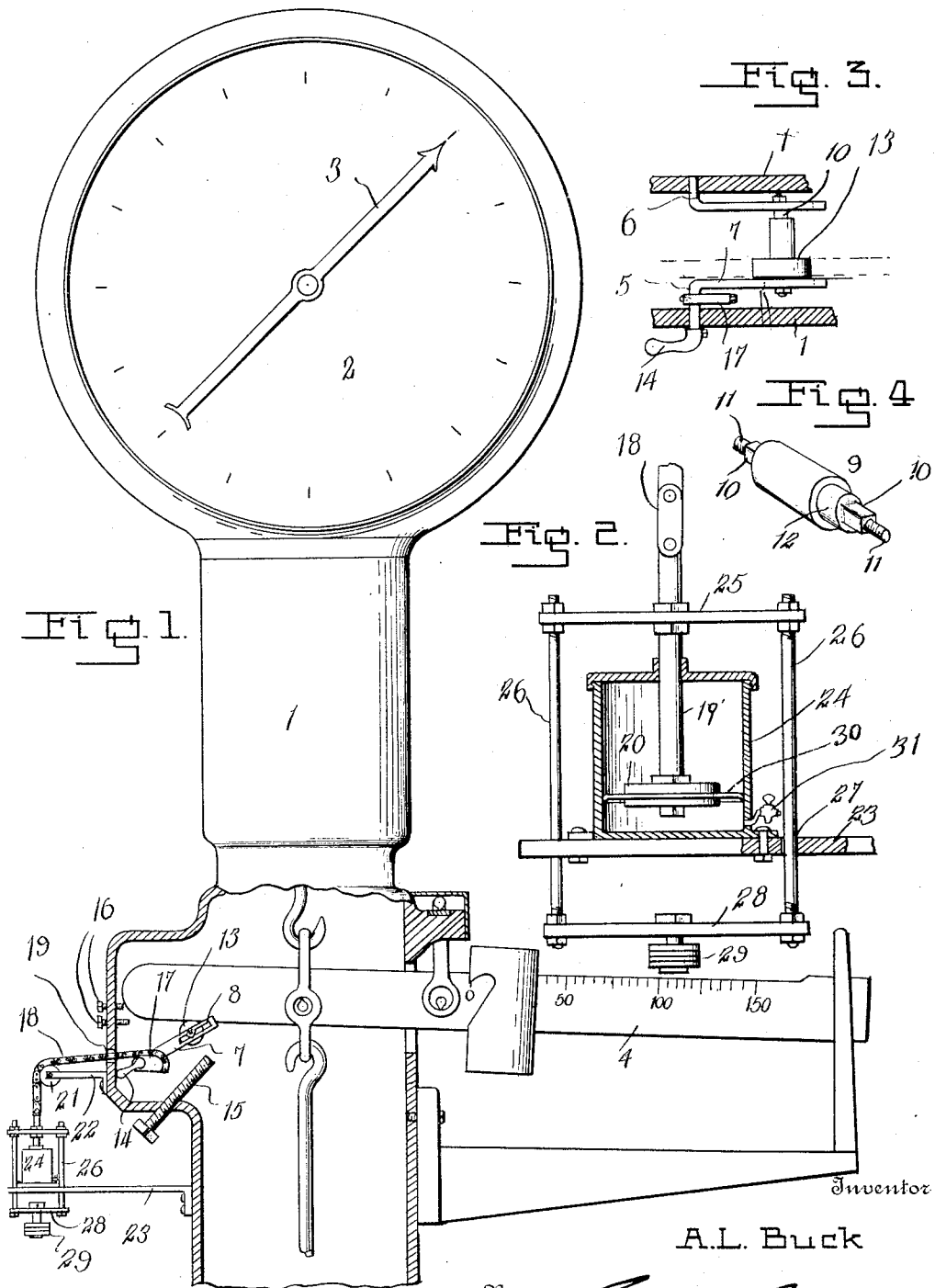
Inventor
A.L. Buck
By Lacey & Lacey, Attorneys Patented May 27, 1930

1,760,342

UNITED STATES PATENT OFFICE

ALONZO L. BUCK, OF LANGLEY, SOUTH CAROLINA

WEIGHING SCALE

Application filed September 26, 1928. Serial No. 308,458.

This invention has reference to weighing scales and its object is to relieve the bearings of weight when a weighing operation has ceased so that wear upon the bearings and cooperating parts will be minimized and the life and accuracy of the machine will be enhanced.

The invention provides a device for the stated purpose which will operate automatically to stop movement of the scale beam or levers and will tend constantly to hold the same in an inactive position so that the scale cannot be left in an unlocked condition.

The invention is illustrated in the accompanying drawings and consists in certain novel features which will be hereinafter first fully described and then more particularly defined in the appended claims.

In the drawing:

Figure 1 is a sectional elevation of a portion of a weighing scale mechanism showing the application thereto of my invention.

Figure 2 is an enlarged sectional elevation of the dash pot mechanism whereby the locking elements are held in active position and the shock of their return to active position is absorbed.

Figure 3 is an enlarged section showing the locking elements.

Figure 4 is an enlarged perspective view of the roller carrying rod which cooperates with the scale beam.

In the drawing, the reference numeral 1 indicates a portion of a column which may be of any approved form and contains a portion of the linkage connecting the platform levers with an indicating mechanism housed behind a dial 2 over which plays a pointer 3. The particular scale chosen for illustration in Figure 1 includes a tare beam 4 and the device of the present invention is shown arranged to act upon the tare beam but it will be understood that the locking device may be arranged to act upon any scale beam and the showing of the drawing is chosen merely for convenience.

In carrying out the invention there is provided a pair of spindles 5 and 6 which are arranged in axial alinement and journaled in the opposite side walls of the column as shown in Figure 3, each spindle being provided within the column with a crank 7 disposed parallel with the adjacent wall of the column and constructed adjacent its free end portion with a longitudinal slot 8 shown in Figure 1. A rod 9 is carried by and between the cranks 7 and has flattened end portions 10 adapted to fit within the respective slots 8 so that rotation of the rod relative to the cranks will be prevented and the rod may be adjusted longitudinally of the cranks. The extremities of the rod form threaded studs 11 adapted to receive nuts turned home against the outer sides of the respective cranks whereby the rod will be secured in a set position. Adjacent one flattened portion 10 there is a reduced cylindrical tenon 12 formed on the rod 9 and upon this tenon 12 is fitted a roller 13 which is adapted to bear against the lower edge of the beam 4, as indicated in Figure 1. At the front of the structure a handle 14 of any convenient form is secured to the projecting end of the spindle 5 so that the spindle may be rocked in the operation of the device and it will be understood that if the handle be rocked in the proper direction the cranks 7 will be swung upwardly so that the sufficient pressure will be exerted upon the tare beam or other scale beam to prevent oscillation of the same and the scale will be thereby locked against action, and wear upon the bearings and other parts will be minimized. By providing a roller 13 to engage the beam, friction upon the beam is reduced, and the annular shoulder defined at the inner end of the tenon 12 serves to maintain the roller in the vertical plane of the beam so that these parts will always be in proper operative relation. When the scale is to be used the handle 14 is rocked so as to swing the crank arms 7 downwardly and thereby permit the beam to operate in the usual manner. To limit the downward movement of the cranks, set screws 15 are mounted in the wall of the column 1 so that the cranks may swing down to a point commensurate with the maximum load of the scale and consequently will be again engaged by the beam if the scale should happen to be overloaded. To limit the upward movement of the cranks 7, set screws 16 are mounted in the wall of the column above the spindles 5 and 6 in position to engage the cranks when they have been swung to a vertical position.

Secured upon the spindle 5 between the cranks 7 thereof and the adjacent wall of the column is an eccentric 17 which is preferably an elliptical or oblong block extending in the same general direction as the cranks 7. To this eccentric is secured one end of a chain or flexible connection 18 which extends outwardly through an opening 19 in the wall of the column and then downwardly to carry a plunger rod 19' and plunger or piston head 20. The intermediate portion of the chain or cable 18 passes over an idle roller 21 which is mounted at the outer end of a bracket 22 secured upon the column, as shown in Figure 1, so that the chain or cable will be properly supported and guided. Below the bracket 22 a second bracket 23 is secured to the column and projects laterally therefrom in the vertical plane of the bracket 22. Secured upon the bracket 23 is a cylinder 24 constituting the outer wall of a dash pot and within which the piston or plunger 20 plays, as shown in Figure 2. Rigidly secured to the rod 19' above the top of the dash pot is a cross bar or yoke 25 having side rods 26 secured in and depending from its ends and passing through openings 27 provided therefore in the bracket or platform 23. The lower ends of the rods 26 are connected by a cross bar 28 from which a weight 29 is suspended in any convenient manner. The piston 20 comprises a flexible diaphragm 30 frictionally engaging the sides of the cylinder 24 and so disposed that upon upward movement of the piston air above the same may escape around the edges thereof while upon downward movement the air below the piston will be trapped to some extent, the downward movement being thereby restricted so that shock upon the working parts will be absorbed. A valve 31 is provided at the lower end of the cylinder to permit venting of the trapped air so that while the movement will be restricted and shock absorbed, the piston may make a complete stroke. Normally, the piston is at the lower end of the cylinder and the cranks 7 will be held up against the scale beam by reason of the connection between the piston and the eccentric 17. When the cranks are swung downwardly by manual manipulation of the handle 14 the chain or cable 18 is wound partly about the eccentric 17 and the piston 20 with the yoke 25 and the parts suspended therefrom are raised. During the weighing operation the attendant will retain his hold upon the handle 14 so as to keep the cranks 7 in their lowered position and permit oscillation of the scale beam. When the weight of the object has been ascertained the attendant releases his hold upon the handle 14 and the weight 29 together with the weight of the cross bars 25 and 28 and the side rods will immediately cause the piston to descend and swing the cranks 7 upwardly so as to again lock the beam. It will thus be seen that the scale can not be left in an unlocked condition to permit excessive oscillation of the working parts thereof with consequent unnecessary wear upon the bearings.

My device is exceedingly simple in the construction and arrangement of its parts and may be readily applied to any existing scale as well as embodied in scales to be built.

Having thus described the invention, what is claimed is:

1. A scale lock comprising a pair of axially alined spindles, cranks on the inner ends of said spindles, a rod adjustably secured in and extending between the cranks to bear against a scale beam and prevent movement of the same, means connected to one of the spindles for manually swinging the cranks away from the scale beam, and means connected with one of the spindles and constantly tending to hold the cranks to the scale beam.

2. A scale lock comprising a pair of spindles adapted to be journaled in a scale frame, means carried by said spindles to engage a scale beam and prevent oscillation of the same, means for manually shifting said means from the scale beam, a weight, a flexible connection between said weight and one of the spindles acting constantly thereon to maintain the scale beam in inactive condition, and means for cushioning the movement of said weight.

3. A scale lock comprising a pair of rotatably mounted spindles, means carried by said spindles to engage a scale beam and prevent movement of the same, means for shifting said means away from the scale beam, an eccentric on one of the spindles, a cylinder disposed below the spindles, a piston working in said cylinder, a flexible connection between the piston and the said eccentric, means for venting the cylinder below the piston, and a weight connected with the piston and tending constantly to hold the same in its lowered position.

In testimony whereof I affix my signature.

ALONZO L. BUCK. [L. S.]